United States Patent
Coviello et al.

(10) Patent No.: US 8,146,146 B1
(45) Date of Patent: Mar. 27, 2012

(54) METHOD AND APPARATUS FOR INTEGRATED NETWORK SECURITY ALERT INFORMATION RETRIEVAL

(75) Inventors: John L. Coviello, Hillsborough, NJ (US); William A. O'Hern, Spring Lake, NJ (US); Stephen G. Roderick, Phillipsburg, NJ (US); Michael R. Singer, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1063 days.

(21) Appl. No.: 11/318,862

(22) Filed: Dec. 23, 2005

(51) Int. Cl.
*G06F 9/00* (2006.01)
*G06F 15/16* (2006.01)
*G06F 17/00* (2006.01)

(52) U.S. Cl. ......................................................... 726/11
(58) Field of Classification Search ...................... 726/11
See application file for complete search history.

(56) References Cited

U.S. PATENT DOCUMENTS

| | | | |
|---|---|---|---|
| 6,006,264 A | 12/1999 | Colby et al. | |
| 6,189,033 B1 | 2/2001 | Jin et al. | |
| 6,222,856 B1 | 4/2001 | Krishnan et al. | |
| 6,473,793 B1 | 10/2002 | Dillon | |
| 6,598,034 B1 | 7/2003 | Kloth | |
| 6,789,203 B1 | 9/2004 | Belissent | |
| 2002/0178383 A1* | 11/2002 | Hrabik et al. | 713/201 |
| 2006/0195566 A1* | 8/2006 | Hurley | 709/224 |

OTHER PUBLICATIONS

"Responding to a Security Incident", www.linuxjournal.com/article/5204, Mar. 4, 2001, by Jose Nazario.*

* cited by examiner

*Primary Examiner* — Edan Orgad
*Assistant Examiner* — Harris Wang

(57) ABSTRACT

A method and apparatus are disclosed whereby databases containing information related to an IP address are accessed directly from within a threat management software tool. When an alert is generated, an element within that alert, such as an IP address, is linked to one or more databases internal to an organization containing information related to the location or identity of a user or computer at a particular IP address. If no matches for that element are found in internal databases, a search of a registry of IP addresses is conducted. Finally, if the searches of internal and external databases are inadequate, an active scan of the device at that particular IP address or a router associated with that IP address is conducted. In this way, information related to a security threat is easily and efficiently obtained to enable a security analyst to better isolate that threat.

14 Claims, 6 Drawing Sheets

FIG. 2

| DATE/TIME | ALERT ID | EVENT | SOURCE IP | SOURCE PORT | DEST. IP | DEST. PORT |
|---|---|---|---|---|---|---|
| 2004/07/08 18:48:44 | A12345678 | SYSTEM SCANNING ACROSS IP ADDRESSES ON SAME PORT | 135.210.96.46 | 137 | 201.1.98.18 | 137 |

FIG. 3

| DATE/TIME 302 | ALERT ID 303 | EVENT 304 | SOURCE IP 305 | SOURCE PORT 306 | DEST. IP 307 | DEST. PORT 308 |
|---|---|---|---|---|---|---|
| 2004/07/08 18:48:44 | A12345678 | SYSTEM SCANNING ACROSS IP ADDRESSES ON SAME PORT | 135.210.96.46 | 137 | 201.1.98.18 | 137 |

ALERTS (1)

System scanning across IP address on same port

Description of Event

The same source IP has attempted connections to 200+ distinct target IP addresses with the same target port

Possible causes

Scanning Activity (may be authorized or unauthorized)
Virus or Worm
Use of Peer-to-Peer file sharing software

Course of Action

1. If this alert is from a 12.xx.xx.xx network source IP address, send email to abc@domain1.net (sample email)
2. Check to see if an open case exists with same source IP or if this is associated with a VPN user <u>IF a case already exists:</u>
-If a case already exists, add this event to the existing case.
-Review alarms in case and determine if appropriate action has been taken. Determine if case should be escalated.

<u>IF a case does not already exists:</u>
-Check for known potential false positive.
-If event is a known potential false positive, create a case - designate as <u>Suspicious Network Activity</u>
- If the event is not a known potential false positive, further investigation is needed with the ports involved to determine if possible Peer-to-Peer activity or virus/worm activity.
-If peer-to-peer activity, create case and handle as <u>Peer-to-Peer</u>
-If virus or worm activity, create case and handle as <u>Malicious Code</u>.
-If none of the the above is appropriate the event should be handle as <u>Suspicious Network Activity</u>

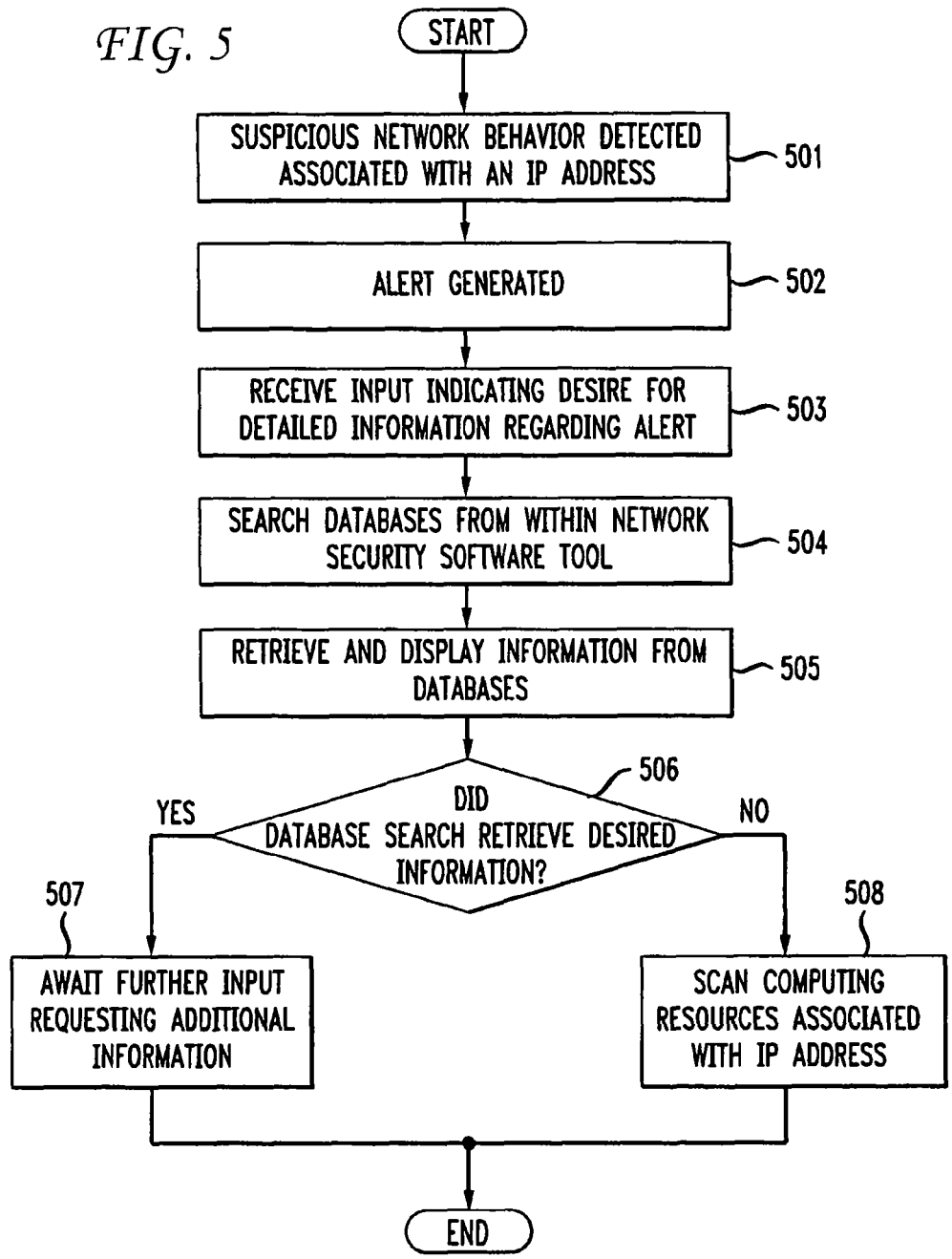

US 8,146,146 B1

METHOD AND APPARATUS FOR INTEGRATED NETWORK SECURITY ALERT INFORMATION RETRIEVAL

BACKGROUND OF THE INVENTION

This application relates generally to network security and, more particularly, to network security software tools having novel information retrieval and display capabilities.

Communication networks have become ubiquitous. As such networks grow in size and complexity, so does the volume of threats directed toward those networks. Viruses, denial of service attacks and other unanticipated vulnerabilities that could permit unauthorized access to network resources have become pervasive and, with the increasing volume of traffic across communication networks, have become harder to detect.

Threat management software tools that alert system administrators to events that may present a threat to communications networks have become more popular. Such tools monitor network traffic for various forms of suspicious behavior, for example, if a computer at a particular IP address is scanning a large number of other IP addresses. Such behavior could indicate the presence of a worm or virus or an attempt to gain unauthorized access to a computer at one of the target IP addresses. One skilled in the art will recognize that myriad different threats to network data and communications exist that require detection and prevention.

One limitation with current threat management tools is that they are often unwieldy to use. For example, when an alert is generated, it is very important to be able to identify the location of a particular IP address within a network as well as the identity of the person who is assigned to that IP address. Some or all of such information may be only available in a stand alone database either internal or external to an organization. However, current threat management tools are not integrated with internal and external databases. Therefore, when an alert indicating suspicious activity originating or destined for a particular IP address is received, it is often difficult to accurately analyze the threat, requiring a security analyst to undertake a manual search of various sources of information in an attempt to resolve the threat. While the IP address may be associated with a particular user, the location of the user's computer and the identity of the user are typically not readily available. This results in frustration on the part of security analysts and delays in addressing security threats as they arose.

SUMMARY OF THE INVENTION

In accordance with the principles of the present invention, databases containing information related to an IP address are accessed directly from within a threat management software tool. When an alert is generated, an element within that alert, such as an IP address, is linked to one or more databases internal to an organization containing information related to the location or identity of a user or computer at a particular IP address. If no matches for that element are found in internal databases, a search of a registry of IP addresses, such as the well-known American Registry of Internet Numbers (ARIN), is conducted. Finally, if the searches of internal and external databases are inadequate, an active scan of the device at that particular IP address or a router associated with that IP address is conducted. In this way, information related to a security threat is easily and efficiently obtained to enable a security analyst to better isolate that threat.

These and other advantages of the invention will be apparent to those of ordinary skill in the art by reference to the following detailed description and the accompanying drawings.

BRIEF DESCRIPTION OF THE DRAWINGS

FIG. 2 shows a database record in accordance with an embodiment of the present invention;

FIG. 3 shows a computer display in accordance with an embodiment of the present invention showing a network security alert;

FIG. 4 shows a computer display showing information retrieved from a database concerning courses of action for addressing one type of security alert;

FIG. 5 shows a method in accordance with an embodiment of the present invention.

DETAILED DESCRIPTION

Figure 1:
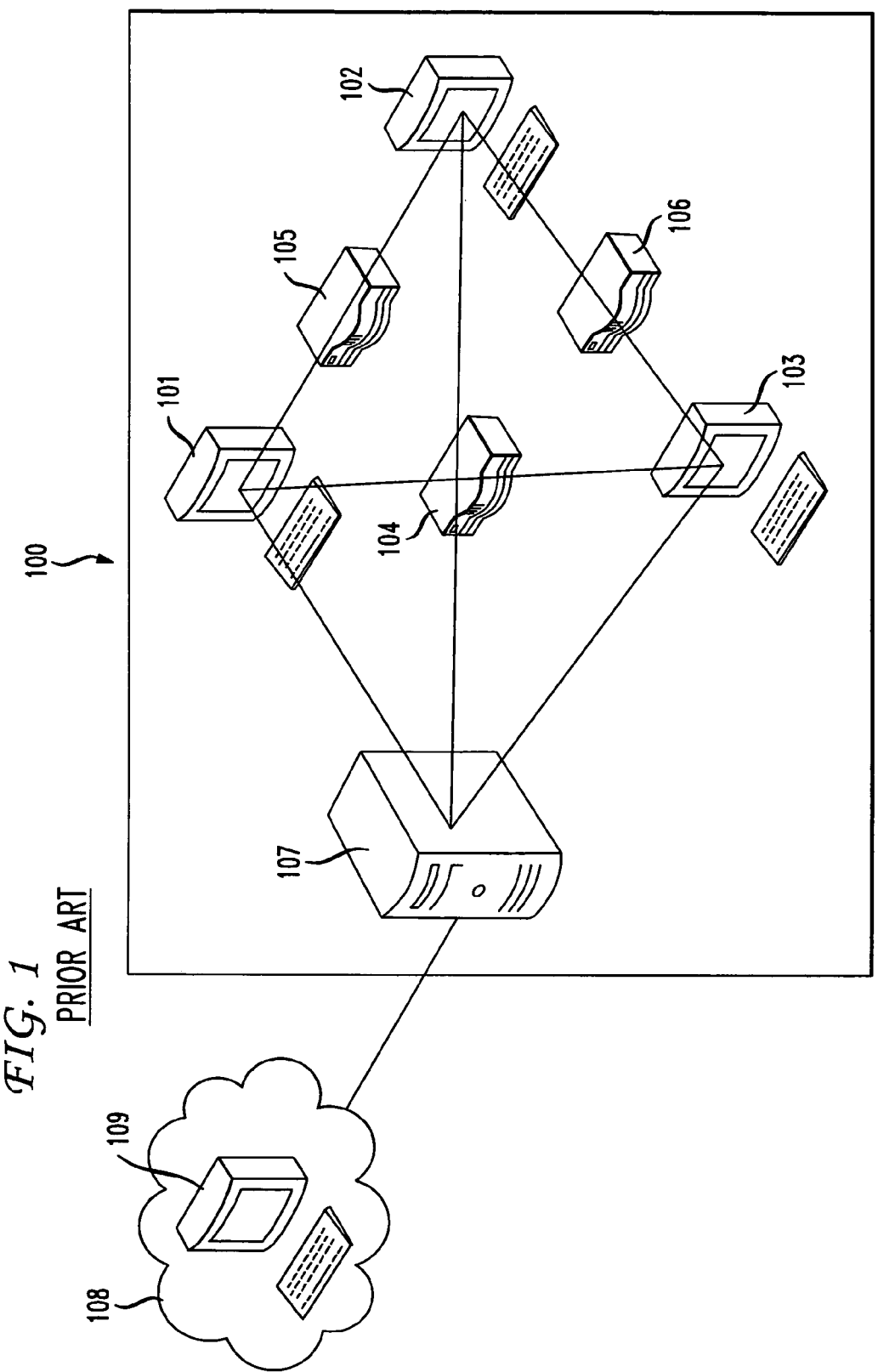
FIG. 1 shows an illustrative prior art network.

FIG. 1 shows a prior art communication network 100 that is, illustratively, a corporate local area network (LAN). Such LANs are extremely well known and will not be described further herein other than as is necessary for the understanding of the present invention. Network 100 has, for example, computers 101, 102 and 103 interconnected via switches 104, 105 and 106. Network 100 also has gateway 107 that functions, illustratively, as an entry point into the network from external sources such as computer 109 in network 108. Network 108 is, illustratively, the Internet.

As corporate networks, such as illustrative network 100, grow increasingly large, the number of threats faced by those networks also grows. These threats include worms, viruses, Trojan horses, denial of service attacks, attempts to gain unauthorized access to computer systems, and other potentially damaging security issues. Such threats are well known in the art and will not be described in detail herein other than as is necessary to understand the principles of the present invention. Due to the magnitude of the problem such threats pose, many corporations have instituted threat management procedures in order to detect security threats and prevent unauthorized access or damage to computer systems or data contained within such systems. For example, many corporations use well-known software tools monitored by security analysts to detect when a potential threat activity is present within a network. As is well-known, such threats may be characterized by a wide variety of behavior, such as a large number of scans from one IP address directed to other IP addresses or a large amount of uncharacteristic traffic directed to or from a particular IP address. When such activity is detected, for example, an alert is typically generated by a software monitoring tool. A security analyst can then initiate an investigation and, if warranted, take action to reduce the potential damage caused by this activity. For example, if a computer at an IP address within the corporate network is behaving suspiciously, a security analyst will attempt to determine if a reasonable explanation exists for that behavior and, if not, may want to isolate that computer from the network so that it can no longer send or receive network traffic. If traffic from an IP address external to the corporate intranet is exhibiting such suspicious behavior, the security analyst may want to block all traffic from that IP address from entering the intranet.

As discussed above, one problem with prior tools designed to monitor network traffic and alert security analysts to suspicious behavior is that they have typically been stand-alone systems. Specifically, prior security software tools typically provide an indication of an IP address and the activity that caused the alert to be generated. Then, it was the job of the security analyst to investigate the alert to determine whether it constituted a legitimate threat. In order to conduct this investigation, however, various types of information were required. For example, while an IP address indicates an address within a network, it is desirable to know where precisely the computer or other device having that IP address is located in relation to other devices, both physically and in terms of network topology. Additionally, information related to the computer, such as the Machine Access Control (MAC) address, is also desirable. However, in most cases, obtaining such information from only an IP address was difficult. Typically, if any such information was available, it was only available in a database separate not accessible directly from the security software tool. Frequently, this difficulty was compounded as multiple databases located from multiple sources had to be accessed in order to obtain the desired information. As a result, the time required to investigate and resolve potential security threats was longer than desired.

The present invention substantially solves these problems. In particular, in accordance with the principles of the present invention, when a security threat is detected by threat management software, an alert is generated. An exemplary record of such as an alert, stored for example in the memory of a computer, is shown in FIG. 2. In particular, referring to that figure, alert record 201 has fields 202-208 representing the date/time the alert was generated, an alert ID, a brief description of the event, and source and destination port and IP addresses, respectively. Here, record 201 shows that an alert assigned an alert ID of A12345678 was generated at 6:48 pm on Jul. 8, 2004. This alert was generated in response to a detection that a computer at source IP address of 135.210.96.46, port 137 was scanning the same port of multiple IP addresses, including port 137 of destination IP address 201.1.98.18.

FIG. 3 shows a graphical display 301 in accordance with the principles of the present invention of an illustrative computer used to monitor network security activity and generate alerts, such as the alert described above in association with FIG. 2. One skilled in the art will recognize that such a computer may be used to track open cases of potential security alerts as well as to track action taken to resolve these alerts. Referring to FIG. 3, the information displayed in fields 202-208 in record 201 of FIG. 2 is shown for viewing as display fields 302-308 in FIG. 3 by, illustratively, a security operator in a network operations center. As discussed previously, while prior network security systems presented similar alerts, to date these systems were independent of other databases and, therefore, required significant manual effort to investigate security alerts.

Therefore, in one embodiment of the present invention, the security alert system represented by the display of FIG. 3 is integrated with proprietary databases maintained by the company or organization operating the network or a third party in order to automate and enhance the speed of security investigations. For example, referring again to FIG. 3, instead of manually referring to a multitude of different databases in order to investigate the circumstances surrounding the alert, a security analyst can simply click on a link, such as a well-known HyperText Markup Language (HTML) link in one of fields 302-308. HTML links and initiating searches by clicking on such links are extremely well known in the art and will not be described in detail herein. In one illustrative example, the Event field 304 is linked to an organizational database of actions to take in the event a particular type of alert is generated. In this case, clicking on the hyperlinked text contained in field 304 will refer to a database containing a record illustrating the actions to be taken when a system is detected as scanning across IP address on the same port. These actions are illustratively shown in a computer display, such as the computer display of FIG. 4. Specifically, referring to FIG. 4, the organization has outlined a set of steps for the security analyst to review, including possible causes of the event as well as courses of action that are to be taken. Other fields of FIG. 3 also may be linked to various databases. For example, The Alert ID field may be linked to a database containing further details related to the alert. This information may include, for example, what facility the source or destination IP addresses are located within and specific details concerning the types of activity monitored over a given time period.

As discussed above, some of the most important information required by a security analyst is information related to the particular computers that are the source and target of a particular security alert. Specifically, the type of computer, operating system, network connections and both physical and network topology locations of the computer are highly important in order to assess a network threat and, if necessary, isolate potential security risks to the network. However, as also discussed above, this information was typically the most likely type of information to be either stored in a proprietary database maintained by a corporation or third party. Therefore, in accordance with another embodiment of the present invention, databases containing this information are also accessible via a hypertext link to that database. For example, by clicking on the Source IP of 135.210.96.46 in field 305 of FIG. 3, a systematic search of one or more databases is initiated for information related to that IP address. First, for example, a company database containing information about all computers in a network may be accessed to obtain information such as the MAC address of the computer, the operating system, the type of computer, the assigned user of the computer, the physical location of the computer, any ports that are open on the computer and information related to the routers through which the computer is connected to the network. One skilled in the art will recognize that such information may not reside in a single company database, but may be contained in more than one such database. In accordance with the principles of the present invention, therefore, clicking on, for example, the Source IP in field 305 may initiate a search of all of these databases simultaneously or sequentially and retrieve appropriate information from those databases.

Referring only to company databases for information related to a computer may be insufficient to provide the security analyst with necessary information. For example, in some cases, the above information may not be available within an organization's database either because the respective organization does not maintain that information or because an error was made in entering information into the database. Therefore, in accordance with another embodiment, if a company's databases do not satisfy the need for information necessary to address a security alert, searches of third party databases may be automatically conducted from within the network security software tool. For example, the American Registry of Internet Numbers (ARIN) maintains a searchable database containing contact and registration information for resources registered with ARIN. ARIN's database contains IP addresses, autonomous system numbers, organizations or customers that are associated with these resources, and related points of contact. Additionally, ARIN maintains a routing registry database that provides a registration service whereby network operators submit, maintain and retrieve routing configuration information. Accordingly, if an organization does not maintain a consolidated database of computing resources, the one or more ARIN databases or similar databases may be automatically accessed via the network security software tool of the present invention.

After conducting this automated systematic search of databases from within the software, it may determined that insufficient information was retrieved to enable the security analyst to address the security alert. In this case, therefore, the systematic automatic data retrieval may be continued by actively scanning the actual computer and/or the router associated with that computer. Once again, the information obtained by such a scan may include the MAC address of the computer, the operating system, the type of computer, and information related to the routers through which the computer is connected to the network.

By utilizing the foregoing systematic approach to automatically searching for information related to a security alert, a security analyst can address any such alerts with greater speed and accuracy than was possible using prior methods. FIG. 5 shows a method in accordance with the principles of the present invention, as described above. At step 501, a suspicious behavior is detected at an IP address that is potentially indicative of a network security threat. Then, at step 502, an alert is generated by a network security software tool and, illustratively, is displayed on a computer display. As discussed above, this alert may have different fields corresponding to the type of alert, the source of the alert, the destination of the alert, and other types of relevant information. At step 503, input is received from, for example, a security analyst, in the form of an illustrative key stroke or mouse click that indicates a desire to obtain more detailed information regarding the alert. In response to this input, at step 504 a search is conducted to one or more databases maintained by the organization or a third party that contain or potentially contain the desired information. At step 505, this information is retrieved and displayed on the computer display for the security analyst. Next, at step 506, a determination is made as to whether the database search(es) retrieved the desired information. If yes, then at step 507 the tool awaits further input requesting additional information. If not, then, for example at step 508, an active scan of the computing resources at the identified IP address or at a router associated with that IP address is conducted to obtain information related to the network and physical location of the resources.

Figure 6:
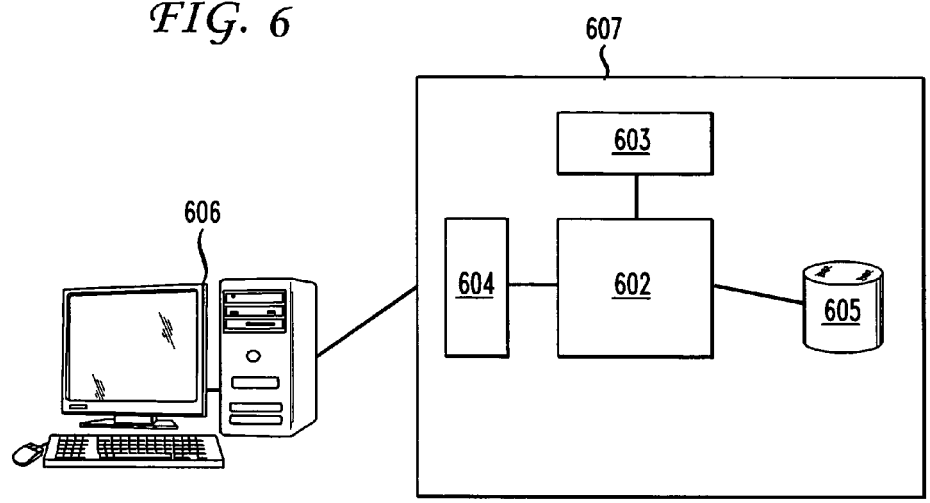
FIG. 6 shows a computer adapted for use in accordance with an embodiment of the present invention.

FIG. 6 shows a block diagram of a computer that can be used to operate the network security software tool and search functions and display the results of those searches as described herein above and in accordance with the method of FIG. 5. Referring to FIG. 6, computer 607 may be implemented on any suitable computer adapted to receive, store, and transmit data such as the aforementioned security alert information. Illustrative computer 607 may have, for example, a processor 602 (or multiple processors) which controls the overall operation of the computer 607. Such operation is defined by computer program instructions stored in a memory 603 and executed by processor 602. The memory 603 may be any type of computer readable medium, including without limitation electronic, magnetic, or optical media. Further, while one memory unit 603 is shown in FIG. 6, it is to be understood that memory unit 603 could comprise multiple memory units, with such memory units comprising any type of memory. Computer 607 also comprises network interface 604 that is used to interface with other network elements and/or nodes either internal to a corporation or other organization via an illustrative intranet or, alternatively, external to that organization via, for example, the Internet. Computer 607 also illustratively comprises a storage medium, such as a computer hard disk drive 605 for storing, for example, data and computer programs adapted for use in accordance with the principles of the present invention as described hereinabove. Finally, computer 607 also illustratively comprises one or more input/output devices, represented in FIG. 6 as terminal 606, for allowing interaction with, for example, a service provider technician or database administrator.

One skilled in the art will recognize that computer 607 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, one skilled in the art will recognize that, instead of automatically conducting the searches of databases for information and/or scanning computers suspected of being security risks, such searches/scans may be initiated by a separate click on a hyperlink. Additionally, as discussed above, such searches maybe conducted sequentially or simultaneously. Those skilled in the art could implement various other feature combinations without departing from the scope and spirit of the invention.

The invention claimed is:

1. A method for use in a network comprising:
   detecting behavior indicative of a security threat associated with a destination network address, the behavior also associated with a source network address, the destination network address associated with a computing resource;
   generating an alert in response to detecting the behavior, the alert comprising a hyperlink configured to initiate a search of a first database and a second database;
   initiating the search of the first database to obtain first information, the first information comprising information relating to an organizational facility associated with the computing resource, a user assigned to the computing resource, and a physical location of the computing resource;
   initiating the search of the second database to obtain second information relating to the alert, the second information comprising a course of action for a security analyst for each type of security threat and information related to a routing registry configuration for the source network address, wherein the search of the second database is initiated upon completion of the search of the first database;
   scanning a the computing resource, the scanning based on the first information, the scanning detecting a media access control address of the computing resource and detecting information related to routers through which the computing resource is connected to a local network; and
   displaying the first information and the second information and the media access control address of the computing resource and the information related to routers through which the computing resource is connected to the local network;

wherein the first database is maintained by an organization operating the network and the second database is maintained by a third party.

2. The method of claim 1 further comprising:

receiving a first indication indicative of a desire to obtain the first information relating to the alert, wherein initiating the search is performed in response to receiving the first indication.

3. The method of claim 1 wherein the first computing resource is a router.

4. The method of claim 2 wherein the first indication comprises a detection of a selection of the hyperlink.

5. The method of claim 1 wherein the first database and the second database each store IP addresses and information associated with the IP addresses.

6. An apparatus for use in a network comprising:

means for detecting behavior indicative of a security threat associated with a destination network address, the behavior also associated with a source network address, the destination network address associated with a computing resource;

means for generating an alert in response to detecting the behavior, the alert comprising a hyperlink configured to initiate a search of a first database and a second database;

means for initiating the search of the first database to obtain first information, the first information comprising information relating to an organizational facility associated with the computing resource, a user assigned to the computing resource, and a physical location of the computing resource;

means for initiating the search of the second database to obtain second information relating to the alert, the second information comprising a course of action for a security analyst for each type of security threat and information related to a routing registry configuration for the source network address, wherein the search of the second database is initiated upon completion of the search of the first database;

means for scanning the computing resource, the scanning based on the first information, the scanning detecting a media access control address of the computing resource and detecting information related to routers through which the computing resource is connected to a local network; and means for displaying the first information and the second information and the media access control address of the computing resource and the information related to routers through which the computing resource is connected to the local network;

wherein the first database is maintained by an organization operating the network and the second database is maintained by a third party.

7. The apparatus of claim 6 further comprising:

means for receiving a first indication indicative of a desire to obtain the first information relating to the alert, wherein the means for initiating the search initiates the search in response to receiving the first indication.

8. The apparatus of claim 6 wherein the computing resource is a router.

9. The apparatus of claim 7 wherein the first indication comprises a detection of a selection of the hyperlink.

10. The apparatus of claim 6 wherein the first database and the second database-store IP addresses and information associated with the IP addresses.

11. A non-transitory computer readable medium storing computer program instructions which, when executed on a processor, define a method comprising:

detecting behavior indicative of a security threat associated with a destination network address, the behavior also associated with a source network address, the destination network address associated with a computing resource;

generating an alert in response to detecting the behavior, the alert comprising a hyperlink configured to initiate a search of a first database and a second database;

initiating the search of the first database to obtain first information, the first information comprising information relating to an organizational facility associated with the computing resource, a user assigned to the computing resource, and a physical location of the computing resource;

initiating the search of the second database to obtain second information relating to the alert, the second information comprising a course of action for a security analyst for each type of security threat and information related to a routing registry configuration for the source network address, wherein the search of the second database is initiated upon completion of the search of the first database;

scanning the computing resource, the scanning based on the first information, the scanning detecting a media access control address of the computing resource and detecting information related to routers through which the computing resource is connected to a local network; and displaying the first information and the second information and the media access control address of the computing resource and the information related to routers through which the computing resource is connected to the local network, wherein the first database is maintained by an organization operating the network and the second database is maintained by a third party.

12. The non-transitory computer readable medium of claim 11 further storing computer program instructions which, when executed on a processor, define a method comprising:

receiving a first indication indicative of a desire to obtain the first information relating to the alert, wherein initiating the search is performed in response to receiving the first indication.

13. The non-transitory computer readable medium of claim 11 wherein the computing resource is a router.

14. The non-transitory computer readable medium of claim 12 wherein the first indication comprises a detection of a selection of the hyperlink.

* * * * *

UNITED STATES PATENT AND TRADEMARK OFFICE
CERTIFICATE OF CORRECTION

| | | |
|---|---|---|
| PATENT NO. | : 8,146,146 B1 | Page 1 of 1 |
| APPLICATION NO. | : 11/318862 | |
| DATED | : March 27, 2012 | |
| INVENTOR(S) | : John L. Coviello et al. | |

It is certified that error appears in the above-identified patent and that said Letters Patent is hereby corrected as shown below:

Claim 1, column 6, line 60, change "scanning a the computing resource" to --scanning the computing resource--

Signed and Sealed this
Sixteenth Day of October, 2012

David J. Kappos
*Director of the United States Patent and Trademark Office*